3,410,750
CLEAR PROTECTIVE RESIN OVERLAYS ON PLASTIC SUBSTRATA FROM PHOSPHORUS CONTAINING AMINO TRIAZINES
Henry P. Wohnsiedler, Noroton, Conn., assignor to Formica Corporation, Cincinnati, Ohio, a corporation of Delaware
No Drawing. Filed July 1, 1965, Ser. No. 468,968
8 Claims. (Cl. 161—191)

ABSTRACT OF THE DISCLOSURE

Clear protective resin overlays for laminates are described. The resin is a reaction product of tris[2-(4,6-diamino-S-triazinyl)ethyl]phosphine oxide and formaldehyde.

---

The present invention relates to certain novel laminate structures which are characterized by suppression of surface crazing and unexpected resistance to weathering effects.

More specifically, the invention pertains to the discovery of a unique heat and pressure consolidated multilayer decorative laminate which has been found to be quite useful for both outdoor and indoor applications and is particularly resistant to burning and surface marring by contact with burning cigarettes and the like.

The laminate structure provided by the manner of practice of our invention basically comprises a substrate member overlaid with a thin film of a novel and unique composition of matter which comprises the resinous reaction product of from 3 to 6 moles of an aldehyde, preferably formaldehyde with about 1 mole of a phosphorus containing aminotriazine of the structure:

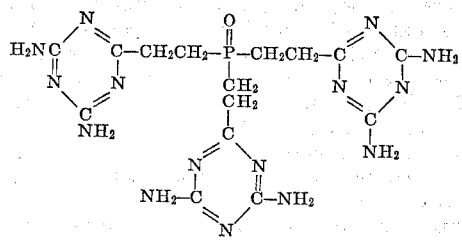

present in the form of a continuous and glossy overlay film having a thickness ranging from about 1 to 3 mils. The substrate member may consist of a directly subadjacent print sheet member adhered to the said top film and supported by a rigid core or base layer or other conventional substrate materials. The surprising and beneficial advantage derived from the herein described combination of substrate and overlay elements is that for most laminate structures excellent durability and superior bond between the various components of the laminate structure is demonstrated. The material is also strongly craze resistant.

To further illustrate the significance of the present discovery, it should be recognized that considerable research has been conducted over recent years, especially with the increased use of plastic materials in building construction in an effort to discover a structural laminate which has (1) a high degree of transparency in the overlay film (2) durability in the face of continued exposure to moisture, heat and other deleterious influences (3) the capacity to resist marring or crazing. To date, however, a satisfactory solution to the problem has not been found. However, with the preparation of the product of the present invention, there appears a laminate structure which not only meets, but exceeds the above criteria.

It is an object of the present invention, therefore, to disclose to the art a laminate structure which has excellent durability, long term mar resistance, and easy inexpensive manufacture.

A second object of the invention is to describe overlay-substrate composite structures which are extremely resistant to marrying and flame resistant. It is a further and more precise object of the invention to disclose a laminate structure having all of the aforesaid advantages which, in addition, does not require an adhesive resin-binder to hold the top or overlay film of protective material to the substrate. With the present structure, therefore, the inherent bondability of the component layers of overlay and substrate renders the laminate article comprised therein, capable of quick and easy manufacture.

Accordingly, it is the general purpose of the present invention to provide a method of manufacturing a weather resistant decorative laminated article having a top film composed of a polymeric reaction product of an aldehyde preferably, formaldehyde and tris[2-(4,6-diamino-s-triazinyl)ethyl]phosphine oxide, which film is tightly bonded to an underlying substrate member. After being assembled, the entire assembly is heat- and pressure-consolidated. These and other objects and purposes of the present invention will be discussed in greater detail hereinbelow.

Consequently, in accordance with the practice of the present invention, the above objects are obtained by the manufacture of a unitary heat- and pressure-consolidated weather resistant decorative laminate which comprises in its broadest manifestation a top film of the above-mentioned resin and a substrate which may be one or more layers of various decorative and/or non-decorative materials. One selected and preferred embodiment of the invention comprises a rigidity-imparting base member such as a phenolic core composed of a multiplicity of paper sheets impregnated by a phenol formaldehyde resin supporting a decorative print sheet which, during the course of manufacture, becomes bonded to both the base or core layer on the bottom and the protective overlay film on the top, and a substantially transparent top film of an adherable resin of the type described above. For the purposes of manufacturing operations, the blend ratio of the two monomers in the resinous top film is preferably from about 3 to 6 moles of the formaldehyde component to about 1 mole of the tris(diamino-s-triazinylethyl)phosphine oxide monomer. The particular preferred embodiment will have a transparent top through which is plainly visible the underlying decorative print sheet. Nevertheless, it is within the concept of the present invention that the print sheet member may be eliminated and the substrate be one that has its own inherent design such as a natural wood grain which is carried through to the viewer. In still another variation falling within the concept, a pigment such as $TiO_2$ may be admixed with the protective top film so as to give rise to a pigmented article having all of the other desirable attributes of the laminate. It now, of course, becomes obvious to those skilled in the art that various other types of colorants and dye stuffs may be introduced into the top film without detracting from the properties of the said novel film.

The primary purpose of the substrate member of my structure is to supply rigidity and where the top layer is transparent to provide a decorative effect. Such conventional base materials as chip board, plywood, cement asbestos board, fiber board, paper either impregnated or non-impregnated, and the like may be used.

In another variation of the structures of the invention as shown in the selected embodiments presented below, certain known thermoplastic or thermosetting resins may be employed as the substrate member with the particularly desirable effect of still further reducing the differential in linear coefficients of expansion in those areas where extreme temperature variations are encountered. As examples of this, one may consider a sheet of polyvinyl chloride or a polymeric methacrylate resin as a base or core. It is, of course, to be understood that the total laminate structure of the invention may itself be affixed by various means such as nailing or cementing of the laminate to an interior or exterior wall or table top, as the case may be.

Concerning those embodiments of the invention wherein it is desired to insert a print sheet member between the base or core member and the top protective overlay film, it is contemplated that conventional print sheet members may be employed, such as, high grade absorbent, regenerated α-cellulose paper which has been marked with a design or dyed or pigmented to impart a solid color thereto. Likewise, a melamine formaldehyde resin impregnated sheet having imprinted thereon a decorative image may be employed as shown in another one of our selected embodiments. A still further print sheet material is comprised of fibrillated wet-spun filaments of a polymer of acrylonitrile. These acrylic fiber sheets are well-known in the papermaking art, e.g., U.S. Patents 2,810,646 and 2,847,455. The materials available for use as print sheets are kraft paper, cotton fabrics, linen fabrics, glass fiber fabric, polyester resin fibers, nylon and the like. Printed designs having an unlimited range or form of artistic effect may be employed, so long as the inks or other coloring matter contained therein are non-bleeding in the curable resinous compositions with which the sheet is subsequently saturated and/or coated. It should be noted that these inks or colorants will preferably be resistant to fading under outdoor conditions. It is possible to provide an additional measure of protection by incorporating in the top layer a known ultraviolet light absorber. In addition, the filaments making up the print sheets may contain minor amounts of such materials as are normally present in textile fibers, e.g., delusterants, antistatic agents, and the like, while the print sheets themselves also contain minor amounts of any of the softening agents, sizes, coating materials and the like commonly employed in the manufacture of paper.

The print sheet members may be used as such or they may be pre-impregnated with known aminotriazine-aldehyde thermosetting resins. These resins as well as techniques for their preparation are shown for example in U.S. patents, No. 2,197,357 to Widmer et al. and No. 2,260,239 to Talbot. These are synthetic resins wherein one or more amino-triazines containing at least two amidogen groups, each having at least one aldehyde-reactable hydrogen atom attached to the amidogen nitrogen atom, e.g., melamine, have been reacted with an aldehyde, such as, formaldehyde, to yield a potentially thermoset resinous condensate, i.e., one which has been carried to an intermediate stage of condensation whereby it remains as a resinous material soluble or readily dispersible in aqueous systems while also remaining capable of being converted, under suitable conditions of heat and pressure, to a substantially insoluble and infusible form.

Melamine is the preferred aminotriazine reactant for preparing the heat-curable or potentially heat-curable partially polymerized aminotriazine-aldehyde resinous reaction products which are employed to impregnate the print sheet, but other aminotriazines, e.g., mono-, di- and tri-substituted melamines, such as the mono-, di- and tri-methylmelamines, and the like; guanamines, such as formoguanamine, acetoguanamine, benzoguanamine, and the like, as well as mixtures of amino-triazines, may also be utilized as reactants. Similarly, formaldehyde either as such or as an aqueous solution, is the preferred aldehyde reactant, but other aldehydes, e.g., acetaldehyde, propionaldehyde, butyraldehyde, benzaldehyde, and the like, or compounds engendering aldehydes, e.g., paraformaldehyde, hexamethylenetetramine and the like, may also be employed. The properties desired in the finished product and economic considerations are among the elements which will determine the choice of the particular aminotriazine and aldehyde employed.

The mol ratio of aldehyde to aminotriazine in the resinous reaction product is not critical, and may be within the order of from about 1:1 to about 6:1, respectively, depending on the nature of the starting materials and the characteristics desired in the final product, but it is preferred that the mol ratio of aldheyde to aminotriazine be within the order of from about 1.5:1 to about 3:1, respectively. Thus, the aldehyde and aminotriazine may be heat-reacted at temperatures ranging from about 40° C. to reflux temperature, i.e., about 100° C., for periods of time ranging from about 30 to about 120 minutes, at a pH ranging from about 7 to about 10, preferably in aqueous medium. Any substance yielding an alkaline aqueous solution may be used to effect alkaline reaction conditions, for example, alkali metal or alkaline earth metal oxides, hydroxides or salts with weak acids, e.g., sodium, potassium or calcium hydroxide or sodium or potassium carbonate. Mono-, di- or triamines, e.g., triethanolamine, alkaline polyamines or polyalkaline polyamines, e.g., 3,3′-iminobispropylamine and the like, may also be used to effect alkaline reaction conditions. When necessary, acidic substances such as hydrochloric acid, sulfuric acid, phosphoric acid, acetic acid, and the like, or salts thereof may also be employed to regulate the pH.

The general conditions for impregnation of print sheets applicable to those situations in which an impregnated print sheet is employed is more elaborately described on pp. 8, 9 and 10 of co-pending U.S. application Ser. No. 19,956 to Kamal et al. Since this aspect does not comprise the essence of applicant's invention, it will not be described in elaborate detail since it is well-known to those versed in the art.

If a substrate material such as a thermoplastic foam, which is sensitive to extreme temperature or pressures is selected, a suitable adhesive admixture such as that particularly described in co-pending application of Kamal Ser. No. 19,956 noted above is added as a bond between the top protective film and the substrate members. It must be borne in mind, however, that when such a peculiar situation arises, the laminating conditions of temperature and pressure must be suitably lower. In general, however, conventional laminating techniques employed in preparing the laminates of the present invention, e.g., the top film and print sheet, if one is used, are first assembled with the base member and inserted in a laminating press plate, such as stainless steel press plates which may have finishes ranging from a mirror polish to a matt or textured surface. Such materials are brought together as a single assembly or as a multiple assembly of two or more such single assemblies. The assembly members are then consolidated by means of heat and pressure into a unitary decorative structure. Besides laminates having only one decorative surface, it is within the metes and bounds of the invention to have a balanced laminate wherein a mirror image of the decorative assembly is bonded to each side of the base or core member so as to give a decorative member having two faces capable of use.

Laminating temperatures ranging from about 135° C. to about 160° C. and preferably from about 140° C. to about 150° C. are employed in normal operation. Pressures ranging from about 150 p.s.i. to about 1500 p.s.i. are conventionally employed. In general, the particular pressures employed will depend in large measure upon the nature of the substrate and the dimension of the thin protective top film of polymer blend. In those cases where relatively thin overlay members are involved in the nature of 1 to 3 mils in thickness, less pressure is required to bond the members together while in the case of relatively thick top films of the magnitude of 20 mils in thickness, relatively high temperatures and pressures may be required. The time required to effect a good bond of the materials when employing temperatures and pressures within the above stated ranges will generally be in the nature of about 15 to 45 minutes. The resulting laminate structure is generally permited to cool to about room temperature before being taken out of the press.

In order that those skilled in the art may more fully understand the inventive concept presented herein, several concrete embodiments of the preferred mode and materials of my invention are set forth in the following paragraphs. It must be remembered that these examples are set forth primarily for illustration and should not be considered for expressed limitations binding on the several claims. All parts and percentages are expressed by weight unless otherwise designated in the specific example.

Example 1.—Resin preparation

Prepare charge by feeding 500 parts of tris[2-(4,6-diamino-s-triazinyl)ethyl]phosphine oxide into a stirred 37% formaldehyde (528 parts) solution in 707 parts water containing 7% methanol and N/2 sodium hydroxide for pH adjustment. The solution is agitated and heated for about 1 hour keeping the pH to about 6.6 and the reaction temperature under 100° C. Upon cooling the resinous reaction product is manifest by the cloudy appearance of the resin solution.

Example 2.—Laminate preparation

A high alpha cellulose white pigmented paper stock was saturated with the resin solution and dried at 158° F. for 30 minutes. It was then heat treated at 194° F. for 30 minutes to insolubilize the resin. The resin content was 47%.

The sheet was then brush-coated twice with the resin solution with drying at 158° F. for 30 minutes after each coating and final heat treatment at 194° F. for 30 minutes. The coated sheet so made, was assembled with 6 sheets of phenolic resin-kraft paper core stock and pressed in a laminating press between stainless steel, highly polished caul plates by heating to 300° F. in 5 minutes under 1100 lbs./sq. in. pressure holding at temperature for 15 minutes, cooling to room temperature and releasing pressure.

The resin overlay so prepared was continuous and glossy. Overlay thickness was 0.4–3 mils and withstood 24 hours contact with 10% citric acid and 10% ammonia. It also withstood favorably the Nema tests for boiling water resistance and cigarette marring.

The compound tris[2 - (4,6 - diaminos-s-triazinyl)ethyl] phospine oxide referred to in the preceding pages of specification forms no part of the present invention and is itself separately disclosed in copending application of Johnson Ser. No. 424,219 filed Jan. 8, 1965 now abandoned, the disclosure of which is incorporated herein by reference.

I claim:

1. A unitary heat- and pressure-consolidated weather resistant decorative laminated article which comprises (I) a rigidity-imparting base member in sheet form having a thickness of at least 1/32 inch, (II) a print sheet member, (III) a protective top film of a resinous reaction product of an aldehyde and a phosphorous containing aminotriazine of the formula:

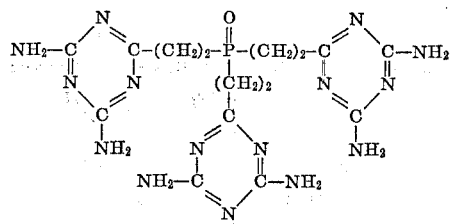

2. A unitary heat- and pressure-consolidated weather resistant decorative laminated article which comprises (I) a rigidity-imparting base member in sheet form having a thickness of at least 1/32 inch, (II) a print sheet member comprising a decorative melamine-formaldehyde resin, (III) a protective top film of a resinous reaction product of an aldehyde and a phosphorous containing aminotriazine of the formula:

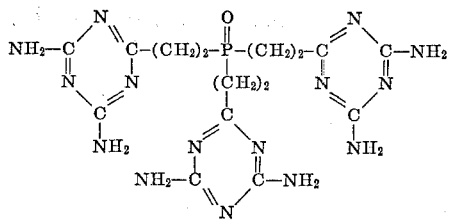

3. A unitary heat- and pressure-consolidated weather resistant decorative laminated article which comprises (I) a rigidity-imparting base member comprising a phenol formaldehyde impregnated paper sheet having a thickness of at least 1/32 inch, (II) a print sheet member in sheet form comprising a thermosetting resin, (III) a protective top film of a resinous reaction product of an formaldehyde and a phosphorous containing aminotriazine of the formula:

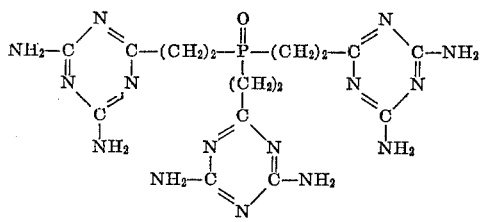

4. A unitary heat- and pressure-consolidated weather resistant decorative laminated article which comprises (I) a rigidity-imparting base member in sheet form of a phenol formaldehyde impregnated paper having a thickness of at least 1/32 inch, (II) a print sheet member comprising a melamine-formaldehyde resin, (III) a protective top film of a resinous reaction product of a formaldehyde and a phosphorous containing aminotriazine of the formula:

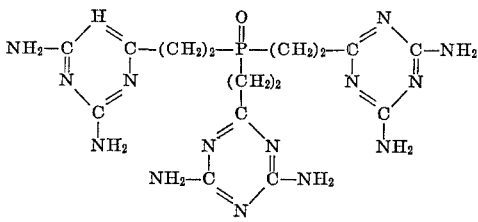

5. A unitary heat- and pressure-consolidated weather resistant decorative laminated article which comprises (I) a rigidity-imparting base member in sheet form of a phenol-formaldehyde impregnated paper having a thickness of at least 1/32 inch, (II) a print sheet member comprising a decorative polyacrylonitrile sheet, (III) a protective top film of a resinous reaction product of a formaldehyde and a phosphorous containing aminotriazine of the formula:

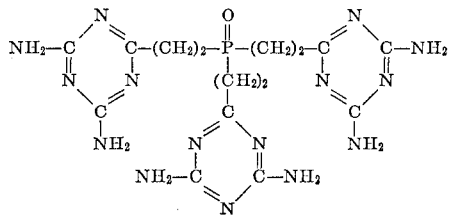

6. A unitary heat- and pressure-consolidated weather resistant decorative laminated article which comprises (I) a rigidity-imparting base member in sheet form having a thickness of at least 1/32 inch and (II) a protective top film of a resinous reaction product of a formaldehyde and a phosphorous containing aminotriazine of the formula:

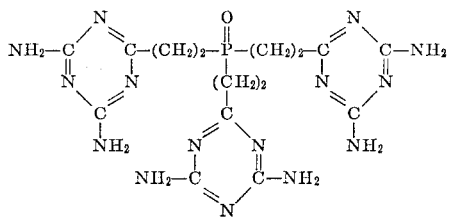

7. A unitary heat- and pressure-consolidated weather resistant decorative laminated article which comprises (I) a rigidity-imparting base member in sheet form comprising a high flow phenolic sheet, a resin impregnated flake board, and a kraft paper balancing sheet and (II) a print sheet member comprising a melamine-formaldehyde resin and (III) a plastic protective film of a resinous reaction product of a formaldehyde and a phosphorous containing aminotriazine of the formula:

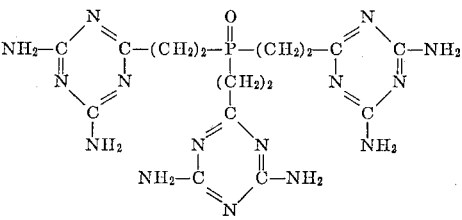

8. A unitary heat- and pressure-consolidated weather resistant decorative laminated article which comprises (I) a rigidity-imparting base member in sheet form comprising a high flow phenolic sheet, a melamine/formaldehyde resin impregnated flake board and a kraft board balancing sheet and (II) a print sheet member comprising a melamine-formaldehyde resin and (III) a plastic protective film of a resinous reaction product of a formaldehyde and a phosphorous containing aminotriazine of the formula:

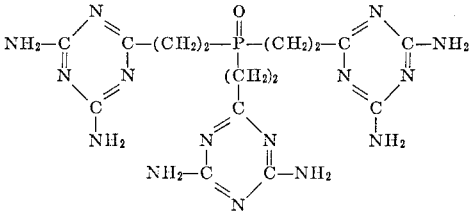

No references cited.

EARL M. BERGERT, *Primary Examiner.*

W. E. HOAG, *Assistant Examiner.*